United States Patent

[11] 3,613,816

| | | |
|---|---|---|
| [72] | Inventor | Walter Gutbrod<br>6601 Bubingen, Saar, Germany |
| [21] | Appl. No. | 765,454 |
| [22] | Filed | Oct. 7, 1968 |
| [45] | Patented | Oct. 19, 1971 |
| [32] | Priority | Oct. 25, 1967 |
| [33] | | Germany |
| [31] | | G 51431 |

[54] SELF-PROPELLED MULTIPURPOSE VEHICLE
11 Claims, 4 Drawing Figs.
[52] U.S. Cl. ..................................................... 180/53,
74/15.63, 180/45, 180/54, 280/91
[51] Int. Cl. ....................................................... B60k 17/28
[50] Field of Search ......................................... 180/53, 54,
44, 49, 70

[56] References Cited
UNITED STATES PATENTS
| 2,853,142 | 9/1958 | Roszler et al. ............... | 180/53 |
| 2,932,102 | 4/1960 | Blomquist ................... | 180/54 X |
| 3,331,464 | 7/1967 | Van Doorne ................. | 180/70 X |

FOREIGN PATENTS
| 875,152 | 4/1953 | Germany ..................... | 180/54 |
| 924,110 | 2/1955 | Germany ..................... | 180/53 |

*Primary Examiner*—A. Harry Levy
*Attorney*—Harness, Dickey & Pierce

ABSTRACT: This invention relates to multipurpose, self-propelled utility vehicles of the two axle type comprising a chassis, a driving mechanism unit disposed transversely to the vehicle's longitudinal axis and mounted on said chassis intermediate the two wheel axles, wherein said mechanism comprises a fuel-burning engine and a gear shift drive or transmission disposed within a troughlike cruciform frame, and power takeoff and hoist means projecting from substantially the center of said chassis along the longitudinal axis of said vehicle, and selectively operable by V-belt pulley members.

The purpose of the above abstract is to provide a nonlegal technical statement adapted to serve as a searching-scanning tool for scientists, engineers and researchers. Accordingly, this abstract is not intended to limit the scope of the invention, hereinafter described in detail, nor is it intended to be used in interpreting or in any way limiting the scope or fair meaning of the claims appended hereto.

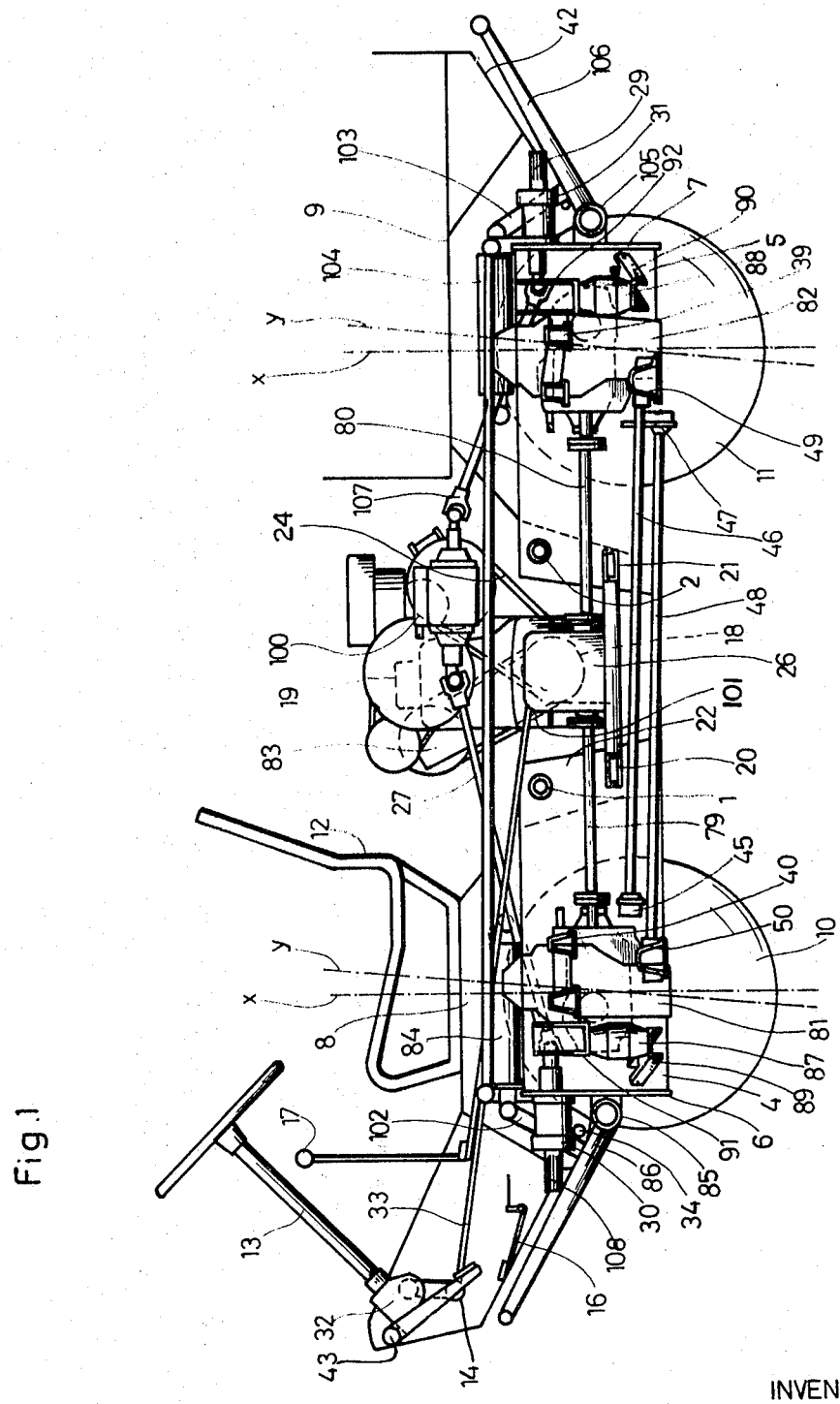

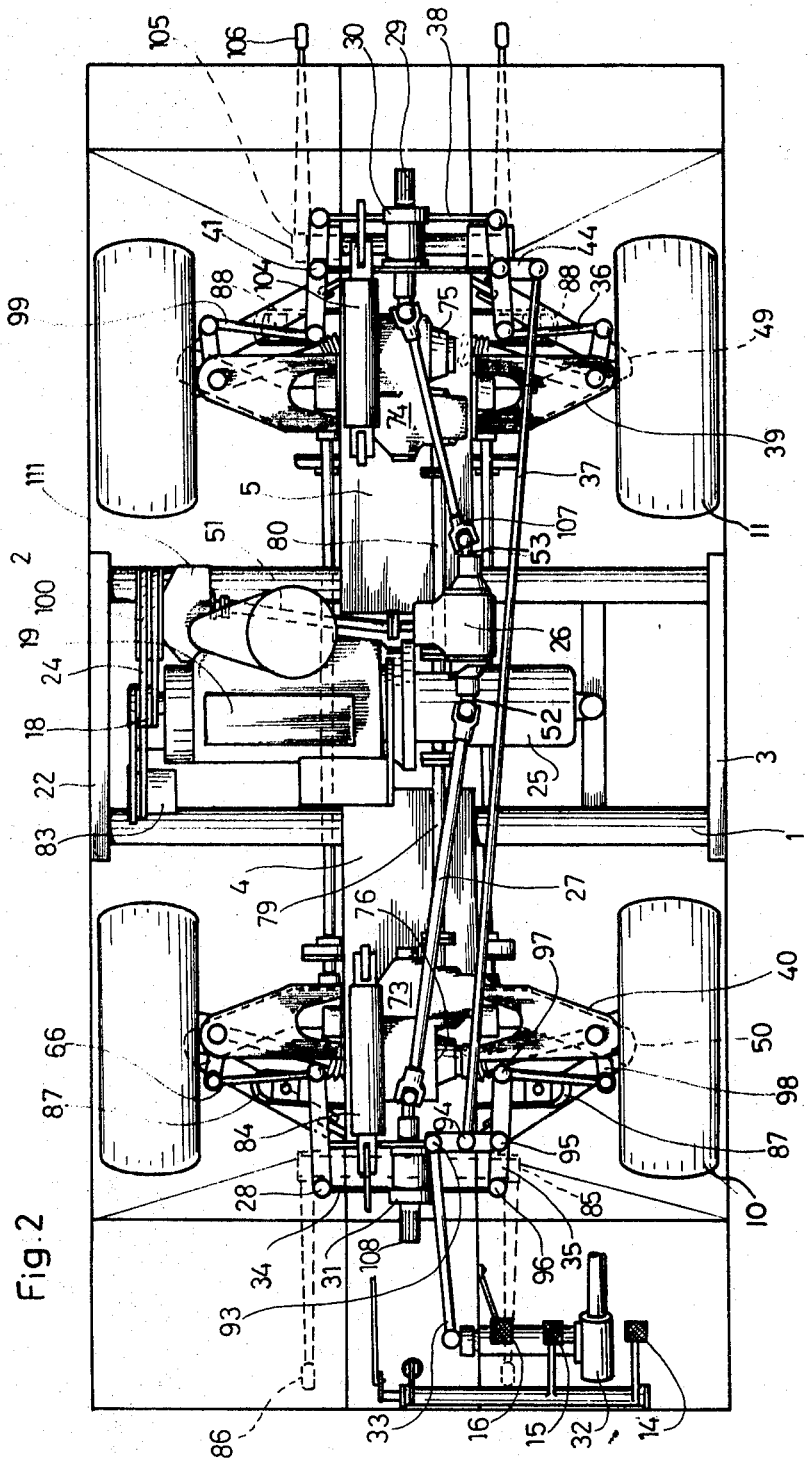

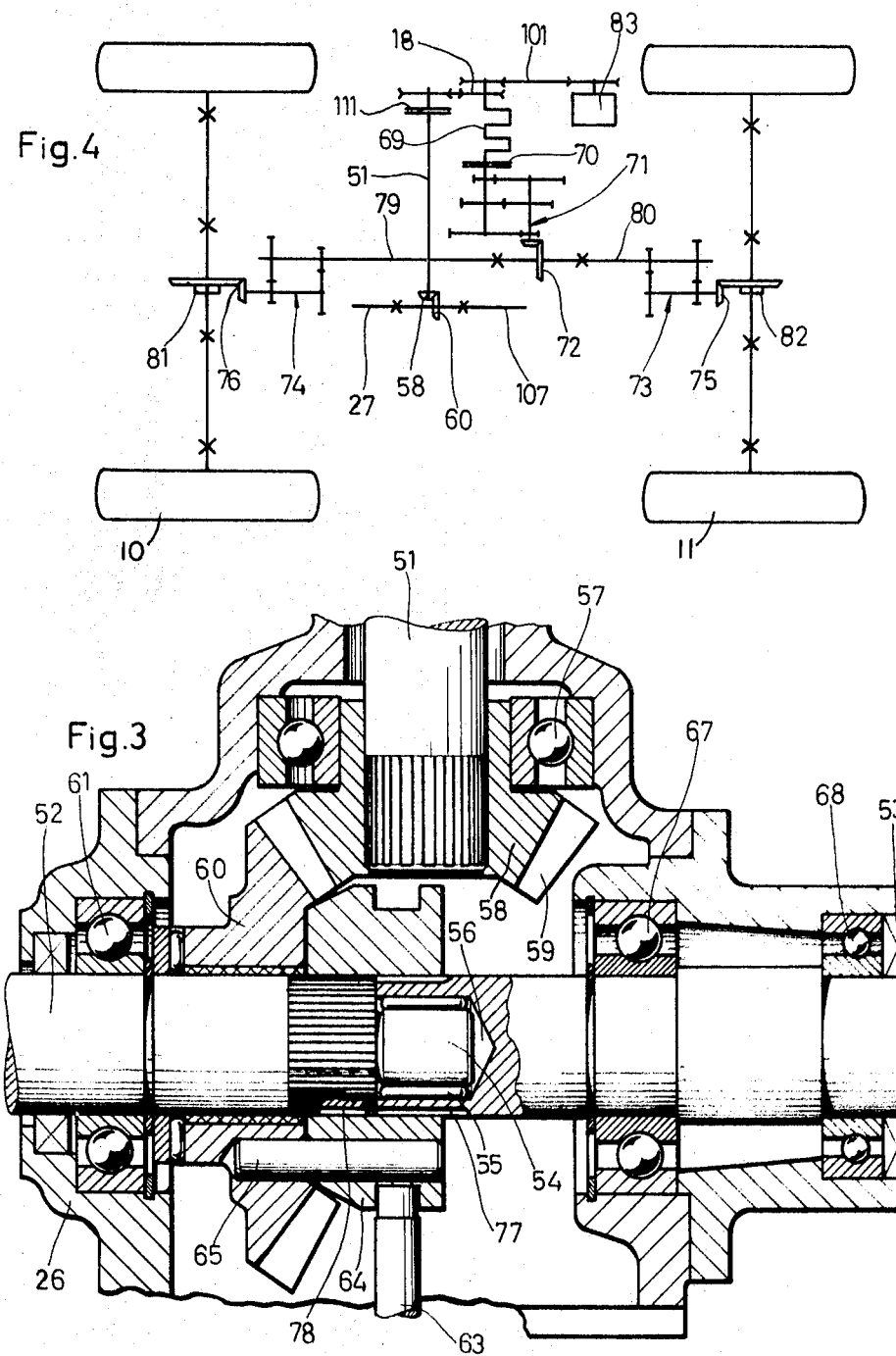

SELF-PROPELLED MULTIPURPOSE VEHICLE

BACKGROUND AND SUMMARY OF THE INVENTION

This invention relates generally to multipurpose vehicles and, more particularly, to a new and improved device which is designed to fulfill general transportation requirements as well as to be operated in fulfillment of cross-country requirements which may, in certain instances, include towing or hoisting operations.

In the past, a variety of multipurpose vehicles have been proposed which, although operating satisfactorily, have proved to be complicated or difficult to operate, while others have required a great degree of maintenance.

The present invention is adapted to overcome the above-noted character of the other devices through the development and arrangement of parts in such a way that the vehicle can be used for general highway transportation, cross-country operation, or general towing or hoisting operations, and also may be used as a built-on or hung-on work performing machine. Because of the multiplicity of operations which are involved, such a vehicle must meet greatly differing requirements. Among other things, its operating range must be great, its ground pressure must be minimized and all four ellipses must be of equal size. The suspension system is such that all four wheels have positive contact with the ground, especially when operating over uneven or difficult terrain. The power takeoff mechanisms are driven in the same way and with the same means at equal distances from a common source of power.

The invention is designed to satisfy these needs through the provision of a driving mechanism unit which is mounted in a cruciform frame and is set transversely to the direction of travel in such a way that the axle drive shafts for the front and rear pair of wheels, as well as for all other power-transmitting elements, project from substantially the center of the vehicle and lie in the longitudinal plane thereof.

By means of these inventive measures, it is insured that the specific surface load, that is, where the tires rest upon the ground, is as small as possible and is substantially equal. With the central location of the drive shaft for the front and rear wheels, the distances over which these shafts extend, as well as the distances for the power hoist and front and rear takeoff assemblies, are equal in their projection from the centermost portion of the vehicle.

In accordance with the invention, the part of the cruciform frame which is disposed transversely to the direction of travel, is made troughlike, and its edge parts are reinforced with tubular profile beams. The engine is mounted in Silentblocks between these profile beams. At both sides of this frame part, mounted transversely to the direction of travel, are boxlike frame parts which are mounted on the longitudinal axis of the vehicle. There is hereby proposed a form of frame adapted to the engine arrangements selected which makes possible a very short wheel base, affords, sufficient space for the wheel suspension system, and which is stiff in resisting vehicular shifting movements.

There are known chassis, which, while not making use of the known sheet metal floor plate, consist of a central tubular beam that permits the arrangement of the drive unit in the middle of the vehicle. In this case the engine, together with the change-gear transmission, and in agricultural vehicles the distributing drive, are combined into a single unit. This arrangement however makes it difficult to mount the engine elastically, and it moreover requires extraordinarily strong and heavy crossbeams that result in an undesirable increase of weight, and that also have a detrimental influence on serial manufacture and on the cost of the vehicle. Furthermore, the engine housing in such cases extends over the useful space above the central-tube beam, and diminishes the economy of the vehicle. In other cases the load area is raised so high to avoid interruption by the engine housing, and, consequently, an unfavorable center of gravity results. This high center of gravity has a very unfavorable effect, particularly when the vehicle is loaded.

Further, it is well known that other designs of the fuel-burning engine and the drive unit assembly which are disposed transversely of the vehicle's longitudinal axis and below a flat load-carrying area are known. With these arrangements, the unoccupied floor space of the vehicle is so small that, apart from special utilizations, the vehicles cannot be used for cross-country travel.

In accordance with one feature of the invention, the driving mechanism unit is mounted in the part of a cruciform frame which is set transversely of the direction of travel in such a way that the axle drive shafts for the front and rear pair of wheels, as well as for all other power transmitting elements, project substantially from the center of the vehicle and lie in the longitudinal direction thereof.

At both sides of the aforementioned frame, there is disposed two boxlike frame members which project along the longitudinal axis of the vehicle. There is disposed within each of these boxes a drive shaft, an intermediate transmission member, an axle drive for each pair of wheels, takeoff shaft mechanisms, and hydraulic cylinders for operation of power hoists. Being mounted within the boxlike frame members, the moving drive parts are protected from dirt, grease and other deleterious materials and can be made readily accessible through closeable openings within the boxes.

The torque for the takeoff shafts, which are disposed at the front and rear sections of the vehicle, is transmitted from the engine crankshaft through a bevel gear drive to articulated shafts which are set at an angle of approximately 10° to 25° relative to the longitudinal axis of the vehicle. The drive ends of the takeoff articulated shafts have their faces projecting in opposite directions and can be engaged or disengaged, both individually and in common, by means of a displaceable switching or shifting sleeve.

The complete wheel suspension system, including the wheel brakes, the transmitting parts, the bearings, and the torsion rod springs, are placed in mirror-image fashion relative to each other, thus affording similarity in construction between the front and rear sections thereof.

This arrangement makes it possible to install the torsion rod springs, supported one above the other, parallel with the vehicle's longitudinal axis. The springs are mounted by their one end so that they cannot turn in the lower cross-links of the wheel suspension, and are fastened by their other end in the frame. The wheel suspensions are slanted back at the front and rear by the so-called trailing or lagging angle. This is designed to increase the stability of forward movement. In spite of the offset positioning of the torsion rod springs, the lagging angle makes it possible to dispose the wheel suspensions on the frame at the same height, as measured from the road. The spacing of the parallel and rearwardly inclined superposed torsion rod springs at each end of the vehicle corresponds to the difference of height between the two ends of the torsion rod. This superposition of the torsion rod is favorable in that it favorably divides up the space and contributes to the compact construction of the vehicle. Their length, which approximates the length of the wheel base, is a determining factor in gentle springing which increases, consequently, the traveling comfort.

Whether traveling over unmaintained thoroughfares or uneven terrain, the springing action is aided by shock absorber elements disposed between the wheel suspension system and the chassis member. Said shock elements come into play when the torsion rod is exerted to approximately one-half of its elastic capability.

The steering movements are imparted by means of a three-armed deviating lever of a steering push rod member which extends in the longitudinal direction of the vehicle and from which the steering for the rearwardly positioned wheels is derived. When operating over uneven terrain or in very sandy locations, the four-wheel steering and drive mechanism, in association with the other vehicle transmitting elements, afford optimum operation through this difficult type of terrain. Additionally, all structural elements for the transmission of steering movement are disposed mirrorlike fashion at both extremities of the vehicle thus alleviating the need for maintaining a large replacement of inventory parts and which, in the end, is designed to simplify repairs.

Other advantages of the present invention will become apparent from a consideration of the following detailed description taken in conjunction with the accompanying drawings.

BRIEF DESCRIPTION OF THE DRAWINGS

FIG. 1 is a view, in elevation, of the self-propelled multipurpose vehicle constructed in accordance with a preferred embodiment of the present invention;

FIG. 2 is a plan view of the vehicle illustrated in FIG. 1;

FIG. 3 is a sectional view of the drive mechanism illustrated in FIG. 1 shown on an enlarged scale; and FIG. 4 is a schematic view of the drive mechanism incorporated in the vehicle of FIGS. 1 and 2.

DETAILED DESCRIPTION OF THE PREFERRED EMBODIMENT

Referring now in detail to the drawings, a self-propelled multipurpose vehicle, in accordance with an exemplary embodiment of the present invention, is shown as comprising a rectangular cruciform frame mounted transversely of the direction of travel and consisting of crossbeams 1, 2, 20 and 21 fixed to end plates 3 and 22. Rectangularly framed longeron members 4 and 5 are mounted adjacent the cruciform frame and projecting forward and rearward along the longitudinal axis of the vehicle. The members 4 and 5 are fabricated in a boxlike construction and are closed at the front and rear ends thereof by implement plates 6 and 7. The center portion of the cruciform frame is made troughlike and, with the boxlike frame longerons, form a rigid chassis which is resistant to the twisting and turning motions of the vehicle. A front pair of fenders 8 and a rear pair of fenders 9 are fastened to the frame longeron members 4 and 5.

A pair of front wheels 10 are suspended from an upper cross-link member 40 and a lower cross-link member 50 and a pair of rear wheels 11 are suspended from an upper cross-link member 39 and a lower cross-link member 49. The suspension system includes two torsion rod members 46 and 48. An end portion of each of the torsion rod members 46 and 48 is mounted securely in holder assemblies 45 and 47 respectively, whereas the opposite portion of each of members 46 and 48 is the torsion rod attached to the lower cross-link members 49 and 50, respectively. Through the attachment methods described, an elastic suspension effect is given to the vehicle through the movement of the associated front and rear wheels 10 and 11. To avoid violent spring motion, which often occurs when traveling over poorly constructed or maintained roads, as well as cross-country travel, auxiliary shock absorber elements 87 and 88, as best seen in FIG. 1, are mounted on bracket members 89 and 90 and abutting at their uppermost portion against chassis abutment members 91 and 92. The shock absorber elements 87 and 88 are designed to operate only when the torsion rod suspension system receives a load which is approximately one-half of its elastic displacement.

The power mechanism is capable of four-wheel steering operation. The directional movements of the vehicle are imparted from a steering column 13, through the intermediary of a steering assembly 32 to a steering push-rod member 33 of the front wheels 10 and, thereto a three-arm T-shaped deviating lever 35 of the left front wheel 10. At a point of articulation 93, the steering push-rod member 33 actuates the T-shaped deviating lever 35. The T-shaped deviating lever 35 also engages a steering push-rod 37 going to the rear wheels 11. A pivot point 95 of the deviating lever 35 is situated at the point of intersection of the two elements of the deviating lever forming the T-shape and the steering movements are, through a pair of links 96 and 97 disposed at the two outer ends of the T-shaped cross-element and on a front middle crossbar 34, transmitted to a two-arm deviating lever 28 of the right front wheel 10, through a link or tie rod 66, and to a steering limb 98 of the left 10 front wheel, respectively.

The steering push-rod 37, running toward the rear, acts on the three-arm deviating lever 44 and, through the arm that extends forward, is connected to a side tie rod 36 running to the left rear wheel 11. Another tie rod 38 is connected to the arm that extends rearwardly for transmitting the steering movements to the right rear wheel 11. For the transmission of the steering movements for the two wheels at the right-hand side of the vehicle there are in each case provided two two-armed deviating levers 28 and 41, as well as the two right-hand front tie rod 66 and rear tie rod 99 acting on the wheels and the deviating lever.

Thus, deviating lever 35 actuates the front right wheel 10 through the front middle crossbar 34 which, through deviating lever 28 front tie rod 66. The front tie rod 66 is, in turn, connected to the right steering limb 98 and its associated axle adjacent the right front wheel 10. When it is desirable to operate the vehicle through the four-wheel steering mechanism, articulated linkage 94 actuates steering push rod 37 which moves in a rearward direction actuating the three-armed deviating lever 44, operates side tie rod 36 located adjacent the left wheel 11 and the tie rod 38. The tie rod 38 actuates the two-armed deviating lever 41 and rear tie rod 99 which is connected to the axle member adjacent the right rear wheel 11.

As best seen in FIG. 1, a driver's seat 12 is suited at approximately the front one-third portion of the vehicle. The front end of the vehicle is closed in by a front sheet metal member 43 which serves to protect pedals 14, 15, and 16 which operate a clutch member, a foot brake member, and an accelerator member, respectively. Also enclosed and protected within this area are gear shift lever 17 and the other operating control and indicating assemblies (not illustrated).

An engine 19, with its associated auxiliary units, (not illustrated) and a gear shift transmission 25 are connected axially with the engine 19, and are situated transversely to the direction of travel of said vehicle. Also, the engine 19 is disposed within the troughlike construction of the cruciform frame and is arranged relative to the vertical, central, longitudinal plane of the vehicle in such a way that the universal jointed shafts 79 and 80 project from the transmission 25 in the direction of the forward and rearwardmost portions of the associated vehicle. Universal jointed shafts 79 and 80 are connected to differential housing 73 and 74 that can be switched or shifted in common, by means of which the gearing steps of the transmission 25 are doubled. The shifting system for the differentials 73 and 74 which can, as selected, be shifted in common or individually, and the shifting system for the main drive or transmission 25 are, for greater clarity, not shown in the accompanying drawings. When use is made of an extremely flat engine, for example, an air-cooled "boxer" engine, the load-carrying area can be extended, in flat forms, as far forward as the driver's seat 12. Additional ancillary housings 75 and 76 are attached integrally with the differential housings 73 and 74 for enclosing the rear and front axle drivers respectively, and differential gears 81 and 82 having differential locks.

The power source for takeoff shafts 29 and 108 is taken from a crankshaft member located adjacent the engine housing and is transmitted by way of a V-belt pulley 18 with its V-belt 24 and an associated V-belt pulley 100. The associated V-belt pulley 100 is connected to a disengageable coupling 111 which, by means of drive shaft 51, acts on a bevel gear drive having a shifting mechanism which is enclosed in a housing 26. Articulated shafts 27 and 107 transmit the torque to the takeoff shafts 29 and 108 which are securably attached at 30 and 31 to a front and a rear implement attaching plate 6 and 7.

The housing 26 supports the shifting mechanism for both takeoff shaft members. With reference now to FIG. 3, the bevel pinion 58 is securely fastened to the associated drive shaft 51 which engages housing 26 by means of bearing 57. When driven, the pinion 58 drives an associated pinion 60 which is free to turn on a shaft 52 mounted in a bearing 61 and which extends toward the front of the vehicle. A pin member 65 is engageable with the pinion 60 through the existence of blind holes in the face thereof and is fastened with a press fit in the shifting or switching sleeve 64. By means of a shifting claw 63, the shifting sleeve 64 is capable of forward axial movement along shaft 52 and rearward axial movement along a rearwardly extending shaft 53. A pin 54 is located at the rearward extremity of shaft 52 and revolves in a recess 56 in the shaft end 53, with a needle-bearing member 55, interposed therewithin. The ends of the shafts 52 and 53 carry external toothing 77 and 78 with which their meshes counter in the bore of the shifting sleeve 64. It will be noted that shafts 52 and 53 are mounted in bearings, generally designated by the numerals 61, 67 and 68 in order to facilitate their rotational movement.

In the illustrated position, by means of drive shaft 51, the bevel pinions 58 and 60 are driven and the pinion 60 through the intermediary of the pin member 65 of the shifting sleeve 64, and the teeth 78 drivingly operates the forwardmost shaft 52. When the shifting sleeve 64 is moved in the direction of the rear takeoff articulated shaft 53, the counter teeth 78 of the shifting sleeve 64 slide into and mesh with the teeth 77 of the shaft 53 and, in this manner rotatably operating both shaft members 52 and 53. It will be noted that in this position, both takeoff shafts are capable of being driven. With further movement of the shifting sleeve 64 by the shifting claw 63, the teeth 78 are able to engage in the counter teeth of the shaft 53 so that, through the intermediary of bevel pinion 60, which still engages the pin 65, the shifting sleeve 64 is able to move toward shaft member 53 so that only the rear takeoff shaft is driven. With still further shifting of the shifting sleeve 64 toward shaft member 53, the pin 65 is able to slide out of the recess of bevel pinion 60 and, as a result, the two drive shafts 52 and 53 are idle.

As best seen in FIG. 1, a pair of hoisting members 86 are 106 located at opposite ends of the vehicle are operated through the intermediary of an additional V-belt transmission drive 101 which operates in conjunction with previously indicated V-belt pulley member 18. When driven, a hydraulic pump 83 fluidly operates a pair of hydraulic cylinders 84 and 104 whose piston rods are, in turn, rotatably mounted in hoisting link members 102 and 103 and which, by means of a pair of hoisting shafts 85 and 105, raise or lower the hoisting levers 86 and 106 as desired.

A schematic of the drive mechanism has been provided for clarity and is best seen in FIG. 4. It will be noted that torque is transmitted from a crankshaft member 69 of the fuel-burning engine 19 by means of a clutch member 70 and a gear shift member 71 to a gear wheel 72. To these are connected the universal jointed shafts 79 and 80. The multipliers of the differential housings 73 and 74, which are only shifted simultaneously, permit increasing or decreasing of speed by means of a change-speed transmission 71. Along with the multipliers the axle drives located in the ancillary housing 75 and 76 which transmit the torque, through the intermediary of differential gears 81 and 82, having locks, are connected to the wheel axles.

While it will be apparent that the preferred embodiment illustrated herein is well calculated to fulfill the objects above stated, it will be appreciated that the powered mechanism of the present invention is susceptible to modification, variation and change without departing from the scope or fair meaning of the claims appended hereto.

What is claimed is:

1. In combination with a vehicle of the type having a chassis and at least two longitudinally spaced wheels supporting axle means; a driving mechanism fixedly supported relative to the chassis intermediate the at least two axle means, which includes a fuel-burning engine and a main transmission driven thereby; a final drive means for driving the wheels on at least one of said axle means; connecting means drivingly connecting said main transmission and said final drive means; and at least one power takeoff mechanism also supported by the chassis; an improvement which comprises a power takeoff transmission powered from said engine and independently of said final drive means and including a disengageable clutch, and means connected to said clutch and engine for driving the former from the latter, an auxiliary shaft means having one end drivingly connected to said clutch, a gear case connected to the opposite end of said auxiliary shaft means, and an output member extending outward of said case and generally parallel to said at least one power takeoff mechanism and driven from said auxiliary shaft means; means mounting said at least one power takeoff transmission generally centrally of said at least two longitudinally spaced axle means; and additional connecting means drivingly connecting said output member and said at least one power takeoff mechanism; the connecting means, said additional connecting means, and said output member lying substantially in the middle of the vehicle and along the longitudinal direction thereof.

2. The invention as set forth in claim 1, wherein said mounting means includes first frame means connected to the chassis including a cruciform member mounted transversely to the longitudinal axis on the vehicle.

3. The invention as set forth in claim 2, wherein said cruciform frame member is made troughlike and said trough is reinforced with tubular profile beams.

4. The invention as set forth in claim 3, wherein said mounting means includes a second frame means contiguous with said first frame means and is fabricated of boxlike, longeron frame members.

5. The improvement of claim 4, wherein said final drive means includes an axle drive means for driving the axle-supported wheels and wherein said boxlike frame members generally surround said driving mechanism, connecting means, and final drive means.

6. The invention set forth in claim 4, wherein said longeron frame members are generally rectangular in shape.

7. The invention as set forth in claim 1, wherein said driving unit has a longitudinal axis, said axis being orientated transversely to the longitudinal axis of the vehicle.

8. The invention as set forth in claim 1, further including a second power takeoff mechanism; said at least one power takeoff mechanism and said second power takeoff mechanism located at opposite ends of the vehicle; said gear case including a second output member also driven from said auxiliary shaft and extending outwardly from said gear case toward and generally parallel to said second takeoff mechanism; and further connecting means drivingly connecting said second output member and said additional power takeoff mechanism.

9. The invention as set forth in claim 8, wherein said additional and further connecting means includes shafts each having a driven end articulated to a corresponding output member; and displaceable sleeve means interposed between said auxiliary shaft and said output members for engaging and disengaging said output members from said auxiliary shaft.

10. The invention as set forth in claim 9, wherein said articulated shafts being set at an angle of 10° to 25° inclination relative to the longitudinal axis of the vehicle.

11. The invention as set forth in claim 1, wherein said wheel-supporting axle means are front and rear axles; said final drive means includes axle drive means in said front and rear axles to power the wheels mounted thereon, and said connecting means drivingly connect said axle drive means to said main transmission; and said wheel-supporting front and rear axle means and final drive means therefor being constructed of substantially mirror image structural elements.